United States Patent

Sakamoto et al.

Patent Number: 6,127,441
Date of Patent: Oct. 3, 2000

[54] EXPANDABLE RESIN COMPOSITION

[75] Inventors: Toshio Sakamoto, Yamato; Koji Ishihara, Tokyo; Takashi Furukawa, Yokohama, all of Japan

[73] Assignee: Nippon Unicar Company Limited, Tokyo, Japan

[21] Appl. No.: 09/425,359

[22] Filed: Oct. 22, 1999

[30] Foreign Application Priority Data

Nov. 5, 1998 [JP] Japan .................................. 10-314537

[51] Int. Cl.$^7$ ....................................................... C08J 9/00
[52] U.S. Cl. ................................ 521/91; 521/81; 521/92; 521/94; 521/112; 521/134
[58] Field of Search ................................... 521/91, 92, 84, 521/112, 134, 81

[56] References Cited

U.S. PATENT DOCUMENTS

| | | | |
|---|---|---|---|
| 5,698,604 | 12/1997 | Kiley | 521/134 |
| 5,783,611 | 7/1998 | Strebel | 521/134 |
| 5,830,392 | 11/1998 | Strebel | 54/134 |
| 5,882,789 | 3/1999 | Jones et al. | 521/134 |
| 6,008,262 | 12/1999 | McKay et al. | 521/134 |

FOREIGN PATENT DOCUMENTS

| | | |
|---|---|---|
| 9-213133 | of 1997 | Japan . |
| 9-52983 | of 1997 | Japan . |
| 10-120385 | of 1998 | Japan . |
| WO94/25497 | 11/1994 | WIPO . |
| WO94/26793 | 11/1994 | WIPO . |

*Primary Examiner*—Morton Foelak
*Attorney, Agent, or Firm*—Saul R. Bresch

[57] ABSTRACT

An expandable resin composition comprising:

(A) 100 parts by weight of HDPE (high density polyethylene) having a DSC melting point of about 127 to about 136 degrees C.; a density of 0.945 to 0.967 gram per cubic centimeter; and a melt flow rate of about 0.1 to about 10 grams per 10 minutes, and for each 100 parts by weight of component (A), (B) about 2 to about 50 parts by weight of polypropylene having a DSC melting point of at least about 130 degrees C.;

(C) about 50 to about 200 parts by weight of an ethylene/alpha-olefin copolymer, prepared with a metallocene catalyst, having a DSC melting point of about 98 to about 121 degrees C.; a density of 0.900 to 0.935 gram per cubic centimeter; and a melt flow rate of about 0.5 to about 3 grams per 10 minutes;

(D) about 0.1 to about 5 parts by weight of a polysiloxane-polyether block copolymer having the following formula:

$$R_3\text{—Si—O—}R_2(\text{SiO})_m\text{—RX(SiO)}_n\text{—SiR}_3$$

wherein each R is independently a monovalent alkyl, alkoxy, hydroxy, aryl, or aralkyl group;
X has the formula: —$(CH_2)_p$—$(O)_q$—$(C_tH_{2t}O)_s$—R';
R' is the same as R above and $(C_tH_{2t}O)_s$ is a radical group of ethylene oxide or propylene oxide polymer; and
m is 5 to 300; n is 2 to 20; p is 0 or 2; q is 0 or 1; t is 2 or 3; and s is 5 to 100; and (E) about 0.02 to about 5 parts by weight of a nucleating agent selected from the group consisting of azodicarbonamide, talc, and mixtures thereof.

4 Claims, No Drawings

EXPANDABLE RESIN COMPOSITION

TECHNICAL FIELD

This invention relates to (i) an expandable resin composition and (ii) a cable containing an expanded layer of the composition.

BACKGROUND INFORMATION

In the technology of insulated wires, especially coaxial cables for high-frequency signal transmission, improvements by way of enhancing the expansion of cellular (or foamed) insulation are desirable in order to decrease leakage attenuation and clarify image and sound.

A typical cable is constructed of metal conductors insulated with a polymeric material. These insulated conductors are generally twisted to form a core and are protected by another polymeric sheath or jacket material. In certain cases, added protection is afforded by inserting a wrap between the core and the sheath. In fiber optics cable, glass fibers are used instead of metal conductors, but a protective sheath is still necessary. A typical coaxial cable is comprised of an inner conductor, typically copper or copper clad steel or aluminum; a dielectric insulation layer; and an outer conductor, for example, aluminum foil with aluminum or copper braid or tube.

The general practice for producing cable insulated with expanded cellular (or foamed) coatings is to use an expansion or blowing process, which relies on chemical or gaseous blowing agents.

A chemical blowing process comprises the following steps: a chemical blowing agent is blended with a resin component at a temperature below the decomposition temperature of the blowing agent; the blended material is fed to an extruder for coating onto a conductor at a temperature above the decomposition temperature of the blowing agent; and the coated layer is subsequently allowed to expand in air and solidify using a coolant such as water. Chemical blowing processes are prevalent to a certain extent because the required investment is lower and the operation is simpler than gas blowing processes in spite of the smaller expansion and lower mechanical strength than is the case with gas blowing processes.

The extent of expansion by a chemical blowing process is, at most, 70 percent by volume. In addition, current processes use high pressure low density polyethylene (HP-LDPE). The expanded products of these processes do not have enough mechanical strength and are unsatisfactory for producing coaxial cables of high quality.

On the other hand, gas blowing processes use, in place of a chemical blowing agent, a chlorofluorocarbon gas such as monofluorotrichlormethane, difluorodichloromethane, trifluorotrichloroethane, and tetrafluorodichloroethane to easily obtain highly expanded products of 80 percent (by volume) expansion or more. Since these processes utilize high density polyethylene, enough mechanical strength is provided to produce coaxial cables of high quality. Chlorofluorocarbon gases, however, because of their negative effect on the ozone layer, are being phased out. Inert gases such as nitrogen, argon, and carbon dioxide have been proposed as alternatives to the chlorofluorocarbon gases. Attempts to substitute nitrogen for the chlorofluorocarbons, however, have resulted in expanded products, which do not have a uniform and fine cell structure. These expanded products are not commercially satisfactory.

It is also found that low density homopolymers of ethylene made by a high pressure process provide mechanical strength inferior to high density polyethylene.

DISCLOSURE OF THE INVENTION

An object of this invention, therefore, is to provide an expandable resin composition and a cable containing an expanded layer of said composition utilizing an inert gas blowing agent wherein the expanded layer is characterized by an expansion of at least about 70 percent by volume; a uniform and fine cell structure; and excellent mechanical strength.

According to the present invention, the object is met by the following expandable resin composition.

The composition comprises:

(A) 100 parts by weight of HDPE (high density polyethylene) having a DSC melting point of about 127 to about 136 degrees C.; a density of 0.945 to 0.967 gram per cubic centimeter; and a melt flow rate of about 0.1 to about 10 grams per 10 minutes, and for each 100 parts by weight of component (A), (B) about 2 to about 50 parts by weight of polypropylene having a DSC melting point of at least about 130 degrees C.;

(C) about 50 to about 200 parts by weight of an ethylene/alpha-olefin copolymer, prepared with a metallocene catalyst, having a DSC melting point of about 98 to about 121 degrees C.; a density of 0.900 to 0.935 gram per cubic centimeter; and a melt flow rate of about 0.5 to about 3 grams per 10 minutes;

(D) about 0.1 to about 5 parts by weight of a polysiloxane-polyether block copolymer having the following formula:

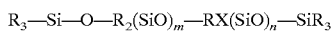

wherein each R is independently a monovalent alkyl, alkoxy, hydroxy, aryl, or aralkyl group;
X has the formula: $-(CH_2)_p-(O)_q-(C_tH_{2t}O)_s-R'$;
R' is the same as R above and $(C_tH_{2t}O)_s$ is a radical group of ethylene oxide or propylene oxide polymer; and
m is 5 to 300; n is 2 to 20; p is 0 or 2; q is 0 or 1; t is 2 or 3; and s is 5 to 100; and (E) about 0.02 to about 5 part by weight of a nucleating agent selected from the group consisting of azodicarbonamide, talc, and mixtures thereof.

DESCRIPTION OF THE PREFERRED EMBODIMENT(S)

Component (A) is a conventional high density polyethylene (HDPE) having a DSC melting point of about 127 to about 136 degrees C.; a density of 0.945 to 0.967 gram per cubic centimeter; and a melt flow rate of about 0.1 to about 10 grams per 10 minutes. The DSC melting point is the melting point determined under JIS (Japanese Industrial Standard) K 7121 by measuring the latent heat of fusion by using a differential scanning calorimeter (DSC). Density is determined under JIS K 7112. The high density polyethylene can be a homopolymer or a copolymer of ethylene and propylene, 1-butene, 1-hexene, 4-methyl-1-pentene, or 1-octene, and can be produced using a chromium based catalyst system, a magnesium-titanium based catalyst system, a vanadium based catalyst system, a single site metallocene based catalyst system, or other transition metal based catalyst systems.

Component (B) is a conventional polypropylene having a DSC melting point of at least about 130 degrees C., preferably about 130 to about 230 degrees C. It can be a homopolymer or a copolymer of propylene and ethylene, 1-butene, 1-hexene, 4-methyl-1-pentene, or 1-octene wherein the propylene is present in an amount of at least about 60 percent by weight, and can be produced using catalysts similar to those used for the preparation of polyethylene, usually those utilizing inside and outside electron donors. See, for example, U.S. Pat. Nos. 4,414,132 and 5,093,415. The density of the polypropylene can be in the range of 0.870 to about 0.915 gram per cubic centimeter, and is preferably in the range of 0.880 to 0.905 gram per cubic centimeter. The melt flow rate can be in the range of about 0.5 to about 20 grams per 10 minutes, and is preferably in the range of about 0.7 to about 10 grams per 10 minutes. Melt flow rate (also referred to as melt index) is determined in accordance with ASTM D-1238, Condition E, measured at 230° C., or JIS K 7210, and is reported in grams per 10 minutes. Impact polypropylenes, random copolymers of propylene, and block copolymers of propylene can also be used, if desired. See, for example, U.S. Pat. No. 4,882,380.

Component (C) is an ethylene/alpha-olefin copolymer, prepared with a metallocene catalyst, having a DSC melting point of about 98 to about 121 degrees C.; a density of 0.900 to 0.935 gram per cubic centimeter; and a melt flow rate of about 0.5 to about 3 grams per 10 minutes. The alpha-olefin can have 3 to 12 carbon atoms, e.g., propylene, 1-butene, 1-hexene, 4-methyl-1-pentene, 1-octene, 1-decene, and 1-dodecene. A copolymer having the above properties has a high melt tension at 140 to 230 degrees C., which is the foaming temperature range. This reduces leakage from cells formed by the foaming gas resulting in the formation of a uniform cellular structure.

The metallocene catalyst used to provide component (C) can also be referred to as a single-site catalyst or a Kaminsky catalyst. A preferred single site metallocene catalyst system can be described as a constrained geometry catalyst containing a metal coordination complex comprising a metal of groups 3 to 10 or the Lanthanide series of the Periodic Table of the Elements and a delocalized n-bonded moiety substituted with a constraint-inducing substituent, said complex having a constrained geometry about the metal atom such that the angle of the metal between the centroid of the delocalized, substituted π-bonded moiety and the center of at least one remaining substituent is less than such angle in a similar complex containing a similar π-bonded moiety lacking in such a constraint-inducing substituent, and provided further that for such complexes comprising more than one delocalized, substituted π-bonded moiety, there is only one cyclic, delocalized, substituted π-bonded moiety for each metal atom of the complex. The catalyst system further comprises an activating cocatalyst.

Preferred catalyst complexes can be represented by the following formulas:

(I) $(Cp)_m MR_n R'_p$ wherein Cp is an unsubstituted or substituted cyclopentadienyl group; M is a transition metal of groups 4 to 10 of the Periodic Table of the Elements; R and R' are each independently a halogen atom, a hydrocarbon group containing 1 to 20 carbon atoms, or a hydrocarboxyl group; m is 1 to 3, n is 0 to 3, p is 0 to 3, and m+n+p is equal to the oxidation state (valence number) of M.

(II) $(C_5R'_m)_p R''_s(C_5R'_m)MQ_{3-p-x}$ (III) $R''_s(C_5R'_m)_2 MQ'$ wherein [in formulas (II) and (III)], $C_5R'_m$ is an unsubstituted or substituted cyclopentadienyl group; each R' is independently a hydrogen atom, an alkyl group of 1 to 20 carbon atoms, an alkenyl group, an aryl group, an alkylaryl group, an arylalkyl group, or two carbon atoms which form a part of $C_4$–$C_6$ ring by binding to each other; R" is one or more of carbon, germanium, silicon, phosphorus, or nitrogen atoms or a combination thereof having a bridging group between two $C_5R'_m$ rings or a bridging group to M by substituting one $C_5R'_m$ ring; x is 1 when p is 0, otherwise x is 0; each Q is independently an alkyl group of 1 to 20 carbon atoms, an alkenyl group, an aryl group, an alkylaryl group, an arylalkyl group, or a halogen atom; Q' is an alkylidene group of 1 to 20 carbon atoms; s is 0 or 1; m is 5; and p is 0, 1, or 2 when s is 0, and m is 4 and p is 1 when s is 1.

(IV)

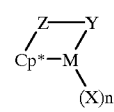

wherein M is a metal of groups 3 to 10 or the Lanthanide series of the Periodic Table of the Elements; Cp* is a cyclopentadienyl or substituted cyclopentadienyl group bound in a η5 bonding mode to M;

z is a moiety comprising boron, sulfur, or oxygen, said moiety having up to 20 non-hydrogen atoms, and optionally Cp* and z together form a fused ring system;

each X is independently an anionic ligand group or neutral Lewis base ligand group having up to 30 non-hydrogen atoms;

n is 0 or 1 to 4 and is 2 less than the valence of M; and y is an anionic or nonanionic ligand group bonded to z and M comprising nitrogen, phosphorus, oxygen, or sulfur and having up to 20 non-hydrogen atoms, optionally, forming a fused ring system.

Examples of metal coordination compounds include (tert-butylamido) (tetramethyl-η5-cyclopentadienyl)-1,2-ethanediylzirconium dichloride, (tert-butylamido) (tetramethyl-η5-cyclopentadienyl)-1,2-ethanediyltitanium dichloride, (methylamido) (tetramethyl-η5-cyclopentadienyl)-1,2-ethanediylzirconium dichloride, (methylamido) (tetramethyl-η5-cycloperitadienyl)-1,2-ethanediyltitanium dichloride, (ethylamido) (tetramethyl-η5-cyclopentadienyl) methylenetitanium dichloride, (tert-butylamido)dibenzyl(tetramethyl-η5-cyclopentadienyl)silanezirconium dibenzyl, (benzylamido)dimethyl(tetramethyl-η5-cyclopentadienyl)-silanetitanium dichloride, (phenylphosphido) dimethyl (tetramethyl-η5-cyclopentadienyl)-silanezirconium dibenzyl, and (tertbutylamido) dimethyl (tetramethyl-η5-cyclopentadienyl)-silanetitanium dimethyl.

Suitable cocatalysts for use in single site metallocene catalyst systems include polymeric or oligomeric alumoxanes, especially methyl alumoxane, dimethyl alumoxane, or a modified methyl alumoxane.

Other examples of single site metallocene catalyst systems can be found in U.S. Pat. Nos. 5,272,236 and 5,317,036.

The polymerization can be carried out in the gas phase or in solution or suspension (slurry). The temperature of the polymerization can be about 0 to about 250 degrees C. The pressure can be about 10 to about 50 Mpa or higher if desired.

Component (D) a polysiloxane-polyether block copolymer having the following formula:

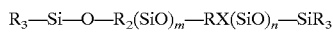

wherein each R is independently a monovalent alkyl, alkoxy, hydroxy, aryl, or aralkyl group;

X has the formula: —$(CH_2)_p$—$(O)_q$—$(C_tH_{2t}O)_s$—R';

R' is the same as R above and $(C_tH_{2t}O)_s$ is a radical group of ethylene oxide or propylene oxide polymer; and m is 5 to 300; n is 2 to 20; p is 0 or 2; q is 0 or 1; t is 2 or 3; and s is 5 to 100.

Examples are:

(1) $(CH_3)_3SiO$—$(Si(CH_3)_2O)_{16}$—$(Si(CH_3)((CH_2)_2O(C_2H_4O)_{10}CH_3)O)_2$—$Si(CH_3)_3$ (2) $(CH_3)_3SiO$—$(Si(CH_3)_2O)_{163}$—$(Si(CH_3)((CH_2)_2O(C_2H_4O)_{17}(C_3H_6O)_8C_2H_5)O)_{13}$—$Si(CH_3)_3$ (3) $(CH_3)_3SiO$—$(Si(CH_3)(C_6H_5)O)_3$—$(Si(CH_3)_2O)_{32}(Si(CH_3)(O(C_2H_4O)_3(C_3H_6O)_7OC_2H_5)O)$—$Si(CH_3)_3$ (4) $(C_2H_5)_3SiO$—$(Si(C_2H_5)_2O)_{216}$—$(Si(C_2H_5)((CH_2)_2O(C_3H_6)_{18}OC2H5)O)$—$Si(C_2H_5)_2(OC_2H_5)$ (5) $(CH_3)_3SiO$—$(Si(CH_3)_2O)_{43}$—$(Si(CH_3)((CH_2)_2O(C_2H_4O)_8OCH_3)O)$ $(Si(CH_2)_2O)_{16}(Si(CH_3)((C_2H_4O)O(C_3H_6O)_{13}OCH_3)O)$—$(Si(CH_3)_2O)_{18}Si(CH_3)_3$ (6) $(CH_3)_3SiO$—$(Si(CH_3)_2O)_{287}$—$(Si(CH_3)((CH_2)_2O(C_2H_4O)_{32}(C_3H_6O)52OC2H5)O)_{16}$—$Si(CH_3)_2OCH_3$ (7) $(CH_3)_3SiO$—$(Si(CH_3)_2O)_{87}$—$(Si(CH_3)((CH_2)_2O(C_2H_4O)_{17}(C_3H_6O)_{23}CH_3)O)_8$—$Si(CH_3)_3$

Component (E) is a nucleating agent selected from the group consisting of azodicarbonamide (ADCA), talc, and mixtures thereof.

For each 100 parts by weight of component (A), the following components are present in the mixture in parts by weight:

| component | broad | preferred |
| --- | --- | --- |
| (B) | about 2 to about 50 | about 10 to about 30 |
| (C) | about 50 to about 200 | about 50 to about 100 |
| (D) | about 0.1 to about 5 | about 0.1 to about 1 |
| (E) | about 0.02 to about 5 | about 0.1 to about 3 |

The mixture of components (A) to (E) is thoroughly mixed (or kneaded) in a conventional mixer or kneader such as a V-blender, a ribbon blender, a Henschel™ mixer, a Banbury™ mixer, a Brabender™ mixer, a Buss™ co-kneader, or a tumbler, or an extruder adapted for mixing at a temperature in the range of about 150 to about 200 degrees C. In this specification, mixing and kneading are synonymous. The expandable resin composition is then introduced into an extruder adapted for expanding (foaming or blowing) the resin composition, generally in the range of about 140 to about 230 degrees C. At about the same time, usually simultaneously with the introduction of the resin composition, an inert gas such as nitrogen is introduced into the extruder in an amount of about 0.01 to about 10 parts by weight of inert gas per 100 parts by weight of expandable resin composition. Other inert gases, which can be used are helium, neon, krypton, xenon, radon, and carbon dioxide. Nitrogen and carbon dioxide are preferred. Also, at about the same time, an electrical conductor or communications medium, or a core containing two or more of same, is introduced into the same extruder, and it is coated in the extruder with the expandable resin composition. The nitrogen serves to expand the resin composition in the extruder or thereafter in air. Water can be used as a coolant to solidify the coating on, for example, wire, glass fiber, or a core containing either. It is found that the coating expands by at least about 70 percent by volume, and often by at least about 80 percent by volume.

Various conventional additives can be added to the expandable resin composition prior to or during the mixing of the components, and prior to or during extrusion. The additives include antioxidants, ultraviolet absorbers or stabilizers, antistatic agents, pigments, dyes, nucleating agents, reinforcing fillers or polymer additives, resistivity modifiers such as carbon black, slip agents, plasticizers, processing aids, lubricants, viscosity control agents, tackifiers, anti-blocking agents, surfactants, extender oils, metal deactivators, voltage stabilizers, flame retardant fillers and additives, crosslinking boosters and catalysts, and smoke suppressants. Additives can be added in amounts ranging from less than about 0.1 to more than about 5 parts by weight for each 100 parts by weight of the resin. Fillers are generally added in larger amounts up to 200 parts by weight or more.

Examples of antioxidants are: hindered phenols such as tetrakis[methylene(3,5-di-tert-butyl-4-hydroxyhydrocinnamate)]-methane, bis[(beta-(3,5-ditert-butyl-4-hydroxybenzyl)-methylcarboxyethyl)]sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)hydrocinnamate; phosphites and phosphonites such as tris(2,4-di-tert-butylphenyl)phosphite and di-tert-butylphenylphosphonite; thio compounds such as dilaurylthiodipropionate, dimyristylthiodipropionate, and distearylthiodipropionate; various siloxanes; various amines such as polymerized 2,2,4-trimethyl-1,2-dihydroquinoline; and butylated hydroxytoluene. Antioxidants can be used in amounts of about 0.1 to about 5 parts by weight per 100 parts by weight of resin.

The expandable resin composition can be mixed and the cable coated with expanded resin can be prepared in various types of extruders, some of which are described in U.S. Pat. Nos. 4,814,135; 4,857,600; 5,076,988; and 5,153,382. All types of single screw and twin screw extruders and polymer melt pumps and extrusion processes will generally be suitable in effecting the process of this invention as long as they are adapted for mixing or foaming. An L type extruder or a single screw extruder of L/D 30:1 to 35:1 can be particularly mentioned. A typical extruder, commonly referred to as a fabrication extruder will have a solids feed hopper at its upstream end and a melt forming die at its downstream end. The hopper feeds unfluxed plastics into the feed section of a barrel containing the processing screw(s) that flux and ultimately pump the plastic melt through the forming die. At the downstream end, between the end of the screw and the die, there is often a screen pack and a die or breaker plate. Fabrication extruders typically accomplish the mechanisms of solids conveying and compression, plastics fluxing, melt mixing and melt pumping although some two stage configurations use a separate melt fed extruder or melt pump equipment for the melt pumping mechanism. Extruder barrels are equipped with barrel heating and cooling features for startup and improved steady state temperature control. Modern equipment usually incorporates multiple heating/cooling zones starting at the rear feed zone and segmenting the barrel and downstream shaping die. The L/D of each barrel can be in the range of about 25:1 to about 35:1.

The expanded resin composition is useful in combination with electrical conductors comprised of metal such as copper or of carbon, or with communications media such as glass or plastic filaments used, for example in fiber optics applications.

This specification is based on Japanese patent application 3145137 filed in Japan on Nov. 5, 1998 (applicant: Nippon Unicar Company Limited; inventors: Sakamoto et al) for which priority is claimed.

The patents and application mentioned in this specification are incorporated by reference herein.

The invention is illustrated by the following examples.

EXAMPLE 1

13 parts by weight of polypropylene having a melting point of 151 degrees C.; density of 0.90 gram per cubic centimeter; and a melt flow rate of 2.7 grams per 10 minutes; 65 parts by weight of an ethylene/hexene-1 copolymer having a melting point of 106 degrees C.; density of 0.923 gram per cubic centimeter; and a melt flow rate of 2.1 grams per 10 minutes prepared using a metallocene catalyst as described above; 1.8 parts by weight of a polysiloxane-polyether block copolymer having formula (1) above; 0.8 part by weight of azodicarbonamide; 0.2 part by weight of talc; and 0.5 part by weight of antioxidant (butylated hydroxytoluene) are mixed with 100 parts by weight of high density polyethylene having a melting point of 135 degrees C.; a density of 0.959 gram per cubic centimeter; a swelling ratio of 48 percent and a melt flow rate of 3.4 grams per 10 minutes. Then the mixture is kneaded with heating using a Banbury™ mixer at 170 degrees C. for 15 minutes to provide an expandable resin composition. The expandable resin composition is made in sheet form. The sheet is cut by a sheet cutter to make pellets 3 millimeters thick, 5 millimeters long, and 4 millimeters wide.

The pellets are then fed into the hopper of a first extruder having a length to diameter ratio (L/D) of 28:1 and a 65 millimeter die; the cylinder temperature of the feeding cone is adjusted at 151 degrees C.; the cylinder temperature of the compression zone at 180 degrees C.; and the cylinder temperature of the metering zone at 187 degrees C. 1.7 parts by weight of nitrogen gas per 100 parts by weight resin are injected by pressure into the compression zone, then the resin is fed into a second extruder having the same L/D and die size as the first extruder. The cylinder temperature of the feeding zone is adjusted at 174 degrees C.; the cylinder temperature of the compression zone at 157 degrees C. and the cylinder temperature of the metering zone at 133 degrees C. The expandable resin composition and nitrogen gas are evenly kneaded to blend the components uniformly. Then the resin is extruded around a copper core wire of 2.4 millimeter diameter through a crosshead with a linear winding rate of 25 meters per minute, and a cellular insulated coaxial cable core having an outer diameter of 9.4 millimeter is obtained.

The coaxial cable core (cellular body) obtained as above has 78.7 percent foaming and a cell diameter of 20 to 80 microns. A cylindrical test piece of the coaxial cable core, 20 millimeters long, is prepared. When its compressive strength is determined with Young's modulus of elasticity calculated by compression volume (strain) and force by compressing towards the direction of the diameter with a speed of 10 meters per minute, the compressive strength is 1.26 kilograms per square millimeter. It is found that the mechanical strength of the test piece is sufficient. Static electricity (static electric capacity) is 47nF per kilometer, which is excellent (nF is defined as nano Farad).

EXAMPLE 2

13 parts by weight of polypropylene having a melting point of 151 degrees C.; a density of 0.90 gram per cubic centimeter; and a melt flow rate of 2.7 grams per 10 minutes; 65 parts by weight of ethylene-hexene-1 copolymer having a melting point of 115 degrees C., a density of 0.930 gram per cubic centimeter; and a melt flow rate of 2.7 grams per 10 minutes prepared with a metallocene catalyst as described above; 0.8 part by weight of polysiloxane-polyether block copolymer of the formula (5); 0.6 part by weight of azodicarbonamide; 0.3 part by weight of talc; and 0.6 part by weight of antioxidant (butylated hydroxytoluene) are mixed with 100 parts by weight of high density polyethylene having a melting point of 132 degrees C.; a density of 0.954 gram per cubic centimeter; a swelling ratio of 58 percent; and a melt flow rate of 4 grams per 10 minutes. The mixture is then kneaded with heating by a Banbury™ mixer at 170 degrees C. for 15 minutes, and an expandable resin composition is prepared in sheet form. The sheet is cut by a sheet cutter to make pellets 3 millimeters thick, 5 millimeters long, and 4 millimeters wide.

The pellets are then fed into a hopper of an extruder having an L/D of 32:1 and a 75 millimeter die. The pellets are heated with a cylinder that encircles the outer side of a screw having the same axis, and are kneaded with the screw. The cylinder is generally comprised of 5 sections. Each section of the cylinder is referred to herein as C1, C2, C3, C4, and C5 in order from the inlet of the extruder to the exit. The temperatures of C1, C2, C3, C4 and C5 are adjusted to 160, 180, 190, 198, and 198 degrees C., respectively. 1.5 parts by weight of nitrogen gas and 0.5 part by weight of carbon dioxide gas (based on 100 parts by weight of the resin) are injected into the C3 section by pressure. The expandable resin composition, nitrogen gas, and carbon dioxide gas are evenly kneaded to blend the composition uniformly. Then the composition is extruded around a copper core wire of 2.4 millimeter diameter through a crosshead with a linear winding rate of 20 meters per minute, and a cellular insulated coaxial cable core having an outer diameter of 12 millimeters is obtained.

The coaxial cable core obtained as above has 83.6 percent foaming and a cell diameter of 10 to 80 microns. A cylindrical test piece of the coaxial cable core, 20 millimeters long, is prepared. The compressive strength of the test piece is determined with Young's modulus of elasticity calculated by compression volume (strain) and force by compressing in the direction of the diameter at a speed of 10 meters per minute, The compressive strength is 1.32 kilograms per square millimeter, and it is found that its mechanical strength is sufficient. In addition, its static electricity is determined to be 46nF per kilometer, which is excellent.

COMPARATIVE EXAMPLE 1

A similar test to Example 1 is carried out except that the amount of ethylene/hexene-1 copolymer is changed to 230 parts by weight. It is found that the Young's modulus of elasticity is 0.87 kilograms per square millimeter, and the mechanical strength is insufficient.

COMPARATIVE EXAMPLE 2

A similar test to Example 1 is carried out except that the amount of ethylene/hexene-1 copolymer is changed to 40 parts by weight. A cellular body having a uniform cellular structure is not obtained. In addition, foaming is 68 percent, and, therefore, a low density cellular body to fulfill the objective of the present invention is not attained.

COMPARATIVE EXAMPLE 3

A similar test to Example 1 is carried out except that the amount of polypropylene is changed to 1.4 parts by weight.

Foaming is 67 percent, and, therefore, a low density cellular body to fulfill the objective of the present invention is not attained.

COMPARATIVE EXAMPLE 4

A similar test to Example 1 is carried out except that the amount of polypropylene is changed to 62 parts by weight. The cellular structure is uneven, and its electrical property is insufficient.

COMPARATIVE EXAMPLE 5

A similar test to Example 1 is carried out except that the amount of polysiloxane-polyether block copolymer is changed to 0.04 part by weight. The cellular structure is uneven, and its electrical property is insufficient.

COMPARATIVE EXAMPLE 6

A similar test to Example 1 is carried out except that the amount of polysiloxane-polyether block copolymer is changed to 6.5 parts by weight. The dielectric constant is elevated and the electrical property has deteriorated.

COMPARATIVE EXAMPLE 7

A similar test to Example 1 is carried out except that the amount of azodicarbonamide (ADCA) and talc is changed to 0.01 part by weight of ADCA alone. Foaming is 65 percent, and, therefore, a low density cellular body to fulfill the objective of the present invention is not attained.

COMPARATIVE EXAMPLE 8

A similar test to Example 1 is carried out except that the amount of azodicarbonamide is changed to 10 parts by weight. The foaming phenomenon is observed to lead to fluctuation of the outer diameter, and its electrical property has deteriorated.

COMPARATIVE EXAMPLE 9

A similar test to Example 1 is carried out except a polypropylene having a melting point of 157 degrees C.; a density of 0.90 gram per cubic centimeter; and a melt flow rate of 3.5 grams per 10 minutes is used instead of the ethylene/hexene-1 copolymer. The coaxial cable obtained shows deterioration of its static electricity to 65 nF per kilometer when it is used for 1 hour at 70 degrees C.

COMPARATIVE EXAMPLE 10

The expandable resin composition prepared in Example 1 is extruded around a copper core wire of 2.4 millimeter diameter through a cross-head with a linear winding rate of 25 meters per minute by using one unit of a 50 millimeter die extruder having an L/D of 28:1 for the chemical foaming process by adjusting the cylinder temperature at the feeding zone to 143 degrees C., the cylinder temperature at the compression zone to 163 degrees C. and the cylinder temperature at the metering zone to 175 degrees C. 1.9 parts by weight of nitrogen gas per 100 parts by weight of the expandable resin composition is injected into the compression zone, and dispersed in the resin components. A cellular coaxial cable core having an outer diameter of 9.4 millimeters is obtained. A coaxial cable core obtained as above has low foaming of 64 percent. Its cellular structure is not only uneven, but also its static electricity 62nF per kilometer, and it does not fulfill the coaxial cable standards.

What is claimed is:

1. An expandable resin composition comprising
   (A) 100 parts by weight of HDPE (high density polyethylene) having a DSC melting point of about 127 to about 136 degrees C.; a density of 0.945 to 0.967 gram per cubic centimeter; and a melt flow rate of about 0.1 to about 10 grams per 10 minutes, and for each 100 parts by weight of component (A),
   (B) about 2 to about 50 parts by weight of polypropylene having a DSC melting point of at least about 130 degrees C.;
   (C) about 50 to about 200 parts by weight of an ethylene/alpha-olefin copolymer, prepared with a metallocene catalyst, having a DSC melting point of about 98 to about 121 degrees C.; a density of 0.900 to 0.935 gram per cubic centimeter; and a melt flow rate of about 0.5 to about 3 grams per 10 minutes;
   (D) about 0.1 to about 5 parts by weight of a polysiloxane-polyether block copolymer having the following formula:

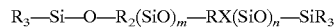

wherein each R is independently a monovalent alkyl, alkoxy, hydroxy, aryl, or aralkyl group;
   X has the formula: $—(CH_2)_p—(O)_q—(C_tH_{2t}O)_s—R'$;
   R' is the same as R above and $(C_tH_{2t}O)_s$ is a radical group of ethylene oxide or propylene oxide polymer; and
   m is 5 to 300; n is 2 to 20; p is 0 or 2; q is 0 or 1; t is 2 or 3; and s is 5 to 100; and
   (E) about 0.02 to about 5 parts by weight of a nucleating agent selected from the group consisting of azodicarbonamide, talc, and mixtures thereof.

2. An expandable resin composition comprising:
   (A) 100 parts by weight of HDPE (high density polyethylene) having a DSC melting point of about 127 to about 136 degrees C.; a density of 0.945 to 0.967 gram per cubic centimeter; and a melt flow rate of about 0.1 to about 10 grams per 10 minutes, and for each 100 parts by weight of component (A),
   (B) about 10 to about 30 parts by weight of polypropylene having a DSC melting point in the range of about 130 to about 230 degrees C.;
   (C) about 50 to about 100 parts by weight of an ethylene/alpha-olefin copolymer, prepared with a metallocene catalyst, having a DSC melting point of about 98 to about 121 degrees C.; a density of 0.900 to 0.935 gram per cubic centimeter; and a melt flow rate of about 0.5 to about 3 grams per 10 minutes;
   (D) about 0.1 to about 1 part by weight of a polysiloxane-polyether block copolymer having the following formula:

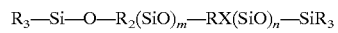

wherein each R is independently a monovalent alkyl, alkoxy, hydroxy, aryl, or aralkyl group;
   X has the formula: $—(CH_2)_p—(O)_q—(C_tH_{2t}O)_s—R'$;
   R' is the same as R above and $(C_tH_{2t}O)_s$ is a radical group of ethylene oxide or propylene oxide polymer; and
   m is 5 to 300; n is 2 to 20; p is 0 or 2; q is 0 or 1; t is 2 or 3; and s is 5 to 100; and
   (E) about 0.1 to about 3 parts by weight of a nucleating agent selected from the group consisting of azodicarbonamide, talc, and mixtures thereof.

3. A cable comprising one or more electrical conductors or communications media, or a core of two or more electrical conductors or communications media, each electrical conductor, communications medium, or core being surrounded by an expandable or expanded resin composition comprising:

(A) 100 parts by weight of HDPE (high density polyethylene) having a DSC melting point of about 127 to about 136 degrees C.; a density of 0.945 to 0.967 gram per cubic centimeter: and a melt flow rate of about 0.1 to about 10 grams per 10 minutes, and for each 100 parts by weight of component (A), (B) about 2 to about 50 parts by weight of polypropylene having a DSC melting point of at least about 130 degrees C.;

(C) about 50 to about 200 parts by weight of an ethylene/alpha-olefin copolymer, prepared with a metallocene catalyst, having a DSC melting point of about 98 to about 121 degrees C.; a density of 0.900 to 0.935 gram per cubic centimeter; and a melt flow rate of about 0.5 to about 3 grams per 10 minutes;

(D) about 0.1 to about 5 parts by weight of a polysiloxane-polyether block copolymer having the following formula:

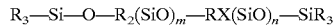

wherein each R is independently a monovalent alkyl, alkoxy, hydroxy, aryl, or aralkyl group;

X has the formula: $-(CH_2)_p-(O)_q-(C_tH_{2t}O)_s-R'$;

R' is the same as R above and $(C_tH_{2t}O)_s$ is a radical group of ethylene oxide or propylene oxide polymer; and m is 5 to 300; n is 2 to 20; p is 0 or 2; q is 0 or 1; t is 2 or 3; and s is 5 to 100; and (E) about 0.02 to about 5 parts by weight of a nucleating agent selected from the group consisting of azodicarbonamide, talc, and mixtures thereof.

4. The cable defined in claim 3 wherein the cable is a coaxial cable.

* * * * *